(12) United States Patent
Yoon

(10) Patent No.: US 7,937,047 B2
(45) Date of Patent: May 3, 2011

(54) METHOD AND APPARATUS FOR TRANSMITTING DATA IN MOBILE TELECOMMUNICATION SYSTEM

(75) Inventor: Young-Ho Yoon, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 950 days.

(21) Appl. No.: 11/828,101

(22) Filed: Jul. 25, 2007

(65) Prior Publication Data

US 2008/0096496 A1    Apr. 24, 2008

(30) Foreign Application Priority Data

Oct. 18, 2006 (KR) ........................ 10-2006-0101211

(51) Int. Cl.
*H04B 1/66* (2006.01)
*H04B 1/04* (2006.01)
(52) U.S. Cl. ...................................... 455/102; 455/103
(58) Field of Classification Search .................. 455/522, 455/102, 103, 115.3, 129; 370/204
See application file for complete search history.

(56) References Cited

U.S. PATENT DOCUMENTS

2004/0203992 A1* 10/2004 Yun ............................... 455/522
2006/0023624 A1*  2/2006 Han et al. ..................... 370/204

FOREIGN PATENT DOCUMENTS

| KR | 1020030070714 | 9/2003 |
| KR | 1020050090230 | 9/2005 |
| KR | 1020060032818 | 4/2006 |

\* cited by examiner

*Primary Examiner* — Nguyen Vo
(74) *Attorney, Agent, or Firm* — The Farrell Law Firm, P.C.

(57) ABSTRACT

A method and an apparatus for using an Adaptive Modulation and Coding (AMC) scheme together with a method of controlling a transmitting power to increase a data transfer rate. The method of transmitting data in a transmitter including a plurality of antennas, includes receiving a Received Signal Strength (RSS) from a receiving portable terminal and determining whether data can be transmitted at the RSS; if the data cannot be transmitted at the RSS, integrating transmitting powers allocated to the plurality of antennas into one antenna to transmit the data when the data cannot be transmitted at the RSS; and transmitting the data using an AMC scheme when the data can be transmitted at the RSS.

16 Claims, 8 Drawing Sheets

METHOD AND APPARATUS FOR TRANSMITTING DATA IN MOBILE TELECOMMUNICATION SYSTEM

PRIORITY

This application claims priority under 35 U.S.C. §119(a) to an application filed in the Korean Intellectual Property Office on Oct. 18, 2006 and assigned Serial No. 2006-101211, the contents of which are incorporated herein by reference.

BACKGROUND OF THE INVENTION

1. Field of the Invention

The present invention generally relates to a method and an apparatus for increasing a data transfer rate of a mobile telecommunication system, and in particular, to a method and an apparatus for increasing a data transfer rate using an Adaptive Modulation and Coding (AMC) scheme together with a control of a transmitting power in a multi-channel system using a plurality of antennas.

2. Description of the Related Art

The quantity of data provided from mobile telecommunication systems has been rapidly increased with the development of mobile telecommunication system technology. Mobile telecommunication business companies have developed technology which enables high-speed data transmission in order to provide high-quality services to users.

As an example of a general method of transmitting and receiving data, a fixed modulation scheme is used to transmit data through an antenna, as shown in FIG. 1A, where data is transmitted using a modulator and is received using a demodulator.

If the data is transmitted using the fixed modulation scheme as illustrated in FIG. 1A, a transfer rate of the data is constant even in a good state of a channel. For example, if a 4 Quadrature Amplitude Modulation (4QAM) scheme is used, a number of transmittable bits per a symbol is constant, i.e., 2 bits, with an increase of a Received Signal Strength (RSS) as shown in FIG. 1B.

In order to solve the above-described problem, an AMC scheme is used to transmit data. The AMC scheme changes a modulation scheme and a coding rate of a channel coder according to changes of channel environments of a downlink. As shown in FIG. 1C, a modulator and a demodulator show how a portable terminal measures a Signal-to-Noise Ratio (SNR) of a downlink and transmits information as to the SNR to a Base Station (BS) through an uplink. The BS estimates environments of a downlink channel based on the information and designates an appropriate modulation scheme and a coding rate of a channel coder based on the estimated value.

FIG. 1D is a graph illustrating a data transfer rate measured if the AMC scheme is used. If a maximum 512QAM modulation scheme is used, data of 9 bits may be transmitted per symbol. Thus, the data transfer rate is higher than when a fixed modulation scheme is used.

Also, there is a method of improving multi-path fading by which a transmitter can transmit data through a plurality of antennas to a plurality of paths, and a receiving portable terminal can reduce interference among the data received through the plurality of paths. An apparatus using the method is illustrated in FIG. 1E, where the transmitter uses two modulators and the receiver uses one demodulator.

The method of FIG. 1E is not to increase a data transfer rate using "Alamouti coding" but to increase an SNR in order to increase a gain. The method is well known and a description will be omitted.

If an AMC scheme is used among the above-described data transmission methods, a large number of bits may be included in a symbol and then modulated to increase a data transfer rate. However, an SNR must be increased to maintain a constant Bit Error Rate (BER).

Also, if a RSS of a portable terminal is smaller than a minimum RSS at which data of one bit is communicated per one symbol using a Binary Phase-Shift Keying (BPSK) method, the data cannot be transmitted through a plurality of antennas.

An AMC scheme and a method of transmitting and receiving data using a multi-path are independent techniques for increasing a data transfer rate of a transmitter. However, if the two methods are combined and used, a performance of the transmitter can be greatly improved.

SUMMARY OF THE INVENTION

The present invention substantially solves at least the above problems and/or disadvantages and provides at least the advantages below. Accordingly, an aspect of the present invention is to provide a method and an apparatus for increasing a data transfer rate of a mobile telecommunication system.

Another aspect of the present invention is to provide a method and an apparatus for combining an AMC scheme with a method of controlling a transmitting power to increase a data transfer rate during a transmission of data in a transmitter.

Still another aspect of the present invention is to provide a method and an apparatus for transmitting data by controlling a transmitting power if a RSS of a receiving portable terminal is smaller than a threshold value.

A further aspect of the present invention is to provide a method and an apparatus for increasing a data transfer rate using an AMC scheme if a RSS of a receiving portable terminal is greater than or equal to a threshold value.

According to an aspect of the present invention, there is provided a method of transmitting data in a transmitter including a plurality of antennas, the method including receiving an RSS from a receiving portable terminal and determining whether data can be transmitted at the RSS; integrating transmitting powers allocated to the plurality of antennas into one antenna to transmit the data when the data cannot be transmitted at the RSS; and transmitting the data using an AMC method when the data can be transmitted at the RSS.

According to another aspect of the present invention, there is provided an apparatus for using an AMC scheme and a method of controlling a transmitting power to transmit data, the apparatus including a controller controlling one of a power manager and a modulator according to a RSS received from a receiving portable terminal; the power manager integrating transmitting powers allocated to a plurality of antennas and allocating the integrated transmitting power to one antenna when the RSS is smaller than a reference threshold value; and the modulator determining a modulation scheme corresponding to the RSS to modulate the data using the determined modulation scheme when the RSS is greater than or equal to the reference threshold value.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described below with reference to the accompanying drawings. In the following description, well-known functions or constructions are not described in detail since they would obscure the invention in unnecessary detail.

The present invention provides a method and an apparatus for using an Adaptive Modulation and Coding (AMC) scheme with a method of controlling a transmitting power to increase a data transfer rate in a transmitter desiring to transmitting data.

Figure 1A:
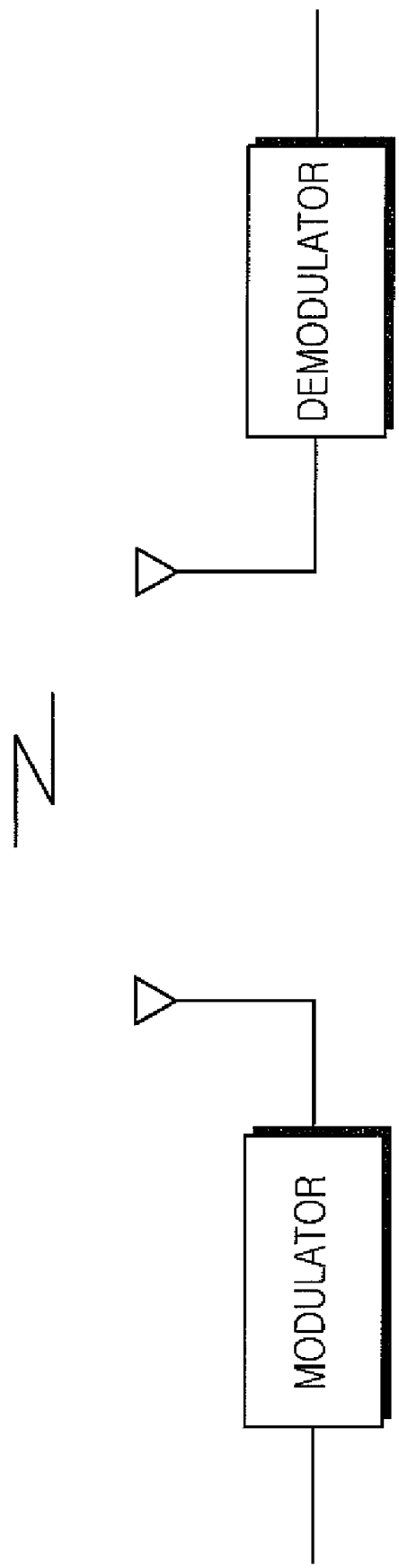
FIG. 1A is a block diagram of an apparatus for transmitting and receiving data through an antenna using a conventional fixed modulation scheme.
Figure 1B:
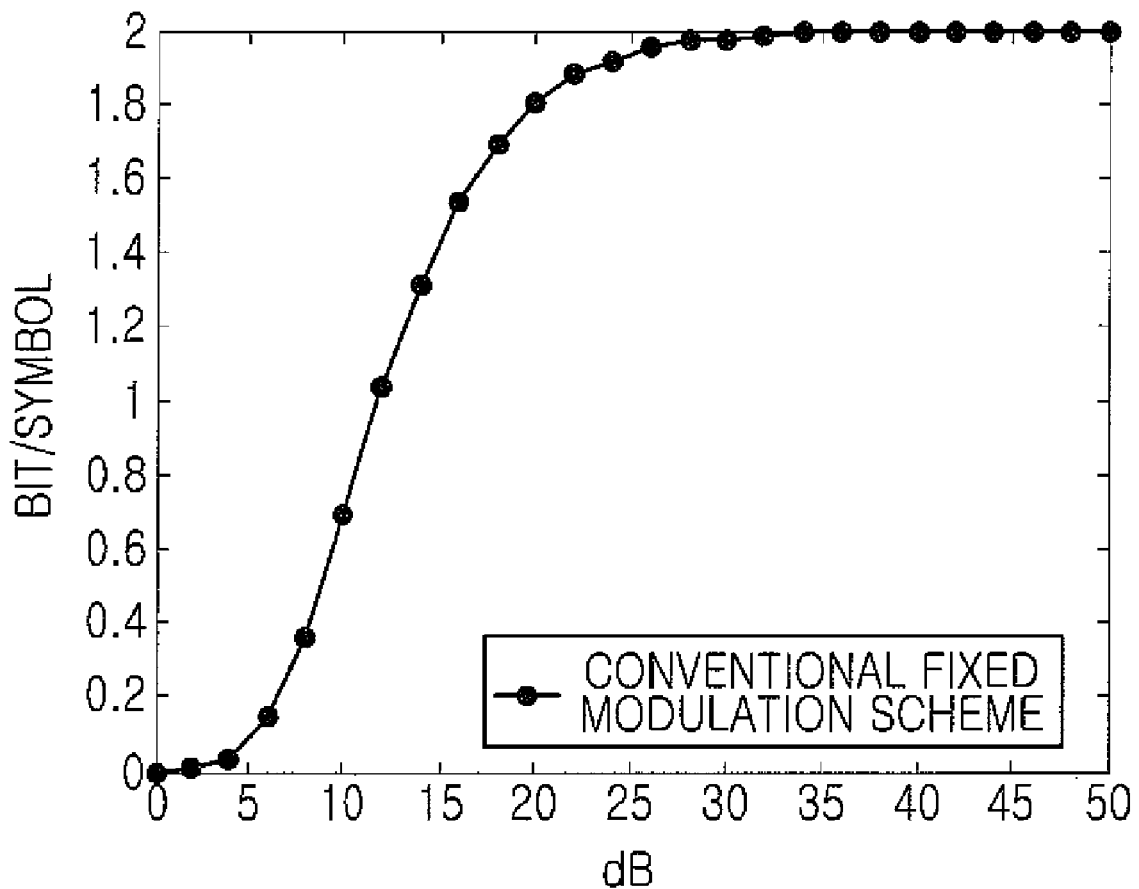
FIG. 1B is a graph illustrating a data transfer rate in a conventional fixed modulation scheme.
Figure 1C:
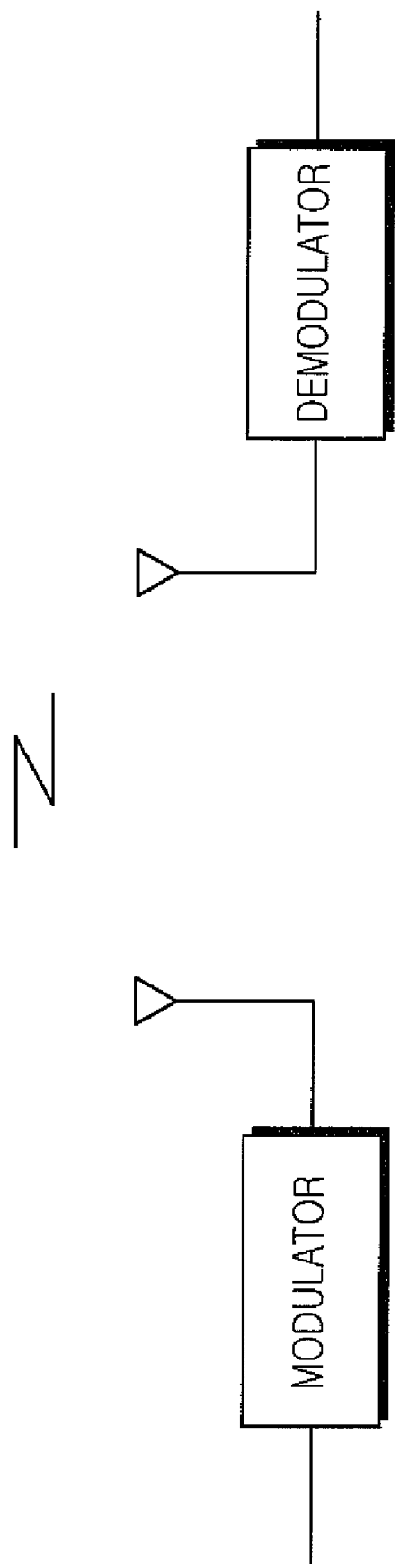
FIG. 1C is a block diagram of a conventional apparatus for transmitting and receiving data using an AMC scheme.
Figure 1D:
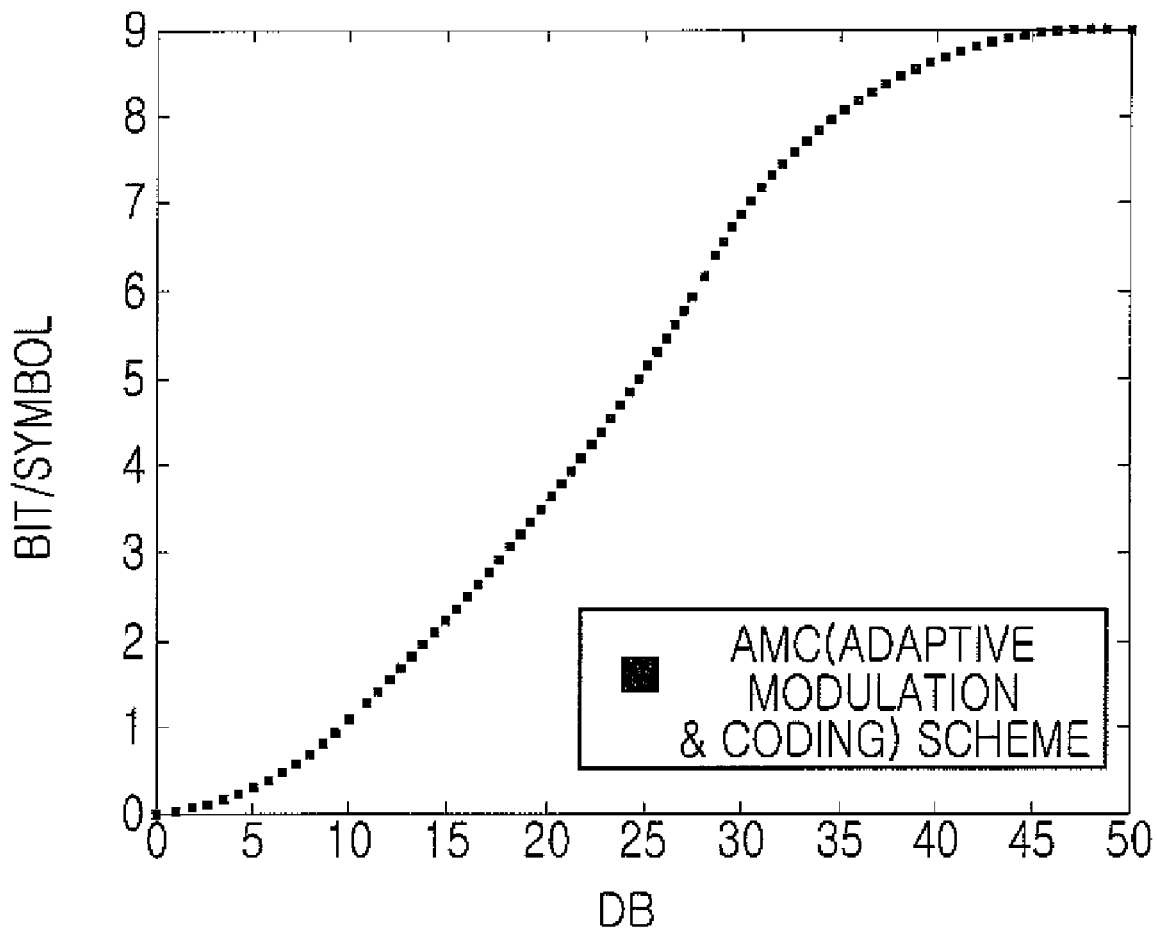
FIG. 1D is a graph illustrating a conventional data transfer rate in an AMC scheme.
Figure 1E:
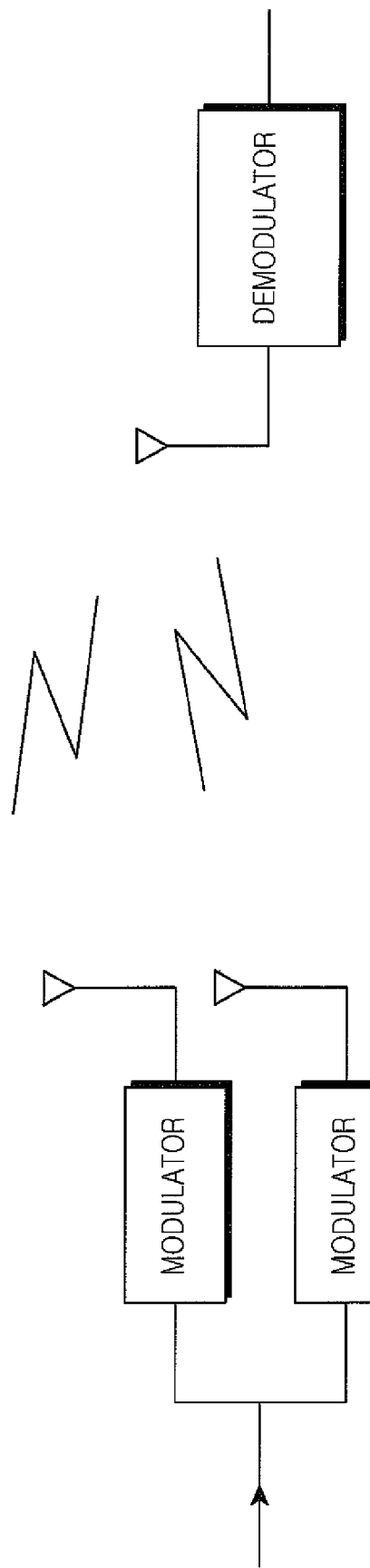
FIG. 1E is a block diagram of a conventional apparatus for transmitting and receiving data using a plurality of antennas.
Figure 2:
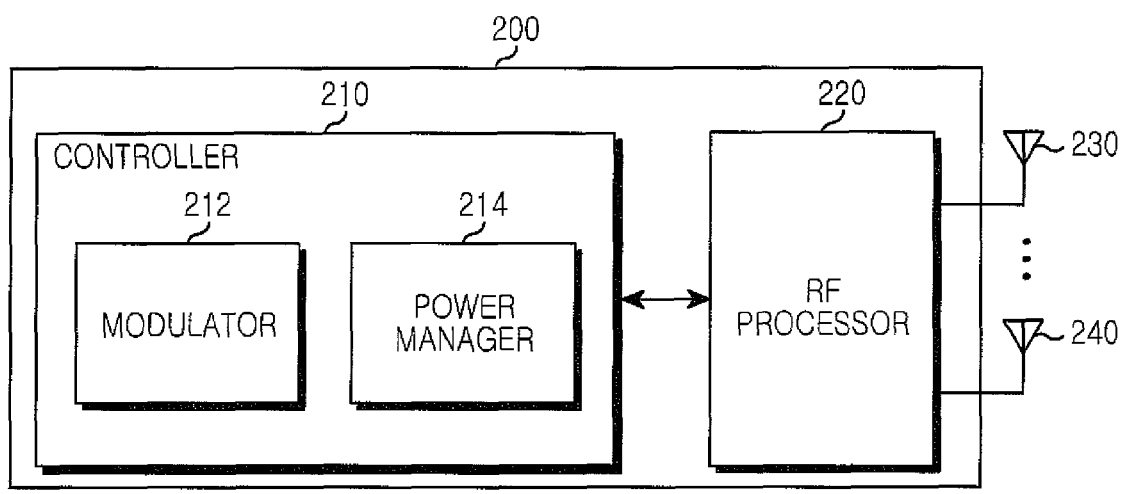
FIG. 2 is a block diagram of a transmitter according to the present invention.

FIG. 2 shows a transmitter according to the present invention. In FIG. 2, a transmitter 200 according to the present invention includes a controller 210 and a Radio Frequency (RF) processor 220. The controller 210 controls the transmitter 200 and includes a modulator 212 and a power manager 214.

The controller 210 controls an overall operation of the transmitter 200. For example, the controller 210 transmits data to a receiving portable terminal. According to the present invention, besides the normal function of transmitting the data, the controller 210 receives a Received Signal Strength (RSS) from the receiving portable terminal and then determines whether the transmitter 200 can communicate with the receiving portable terminal at the RSS.

If the transmitter 200 can communicate with the receiving portable terminal at the RSS, the controller 210 instructs the modulator 212 to determine a modulation scheme corresponding to the RSS, modulate data using the determined modulation scheme, and transmit the modulated data.

If the transmitter 200 cannot communicate with the receiving portable terminal at the RSS, the controller 210 instructs the power manager 214 to integrate transmitting powers allocated to a plurality of antennas 230 and 240 into one transmitting power and transmit the data at the integrated transmitting power.

The modulator 212 is instructed by the controller 210 to determine the modulation scheme corresponding to the RSS received from the receiving portable terminal and modulate the data using the determined modulation scheme.

The power manager 214 is instructed by the controller 210 to adjust a transmitting power of the transmitter 200. In other words, the power manager 214 may equally allocate transmitting powers to the plurality of antennas 230 and 240 or may integrate transmitting powers allocated to the plurality of antennas 230 and 240 to allocate the integrated transmitting power to one antenna.

The RF processor 220 converts a baseband signal output from the modulator 212 into an RF signal and transmits the RF signal through the plurality of antennas 230 and 240.

Figure 3:
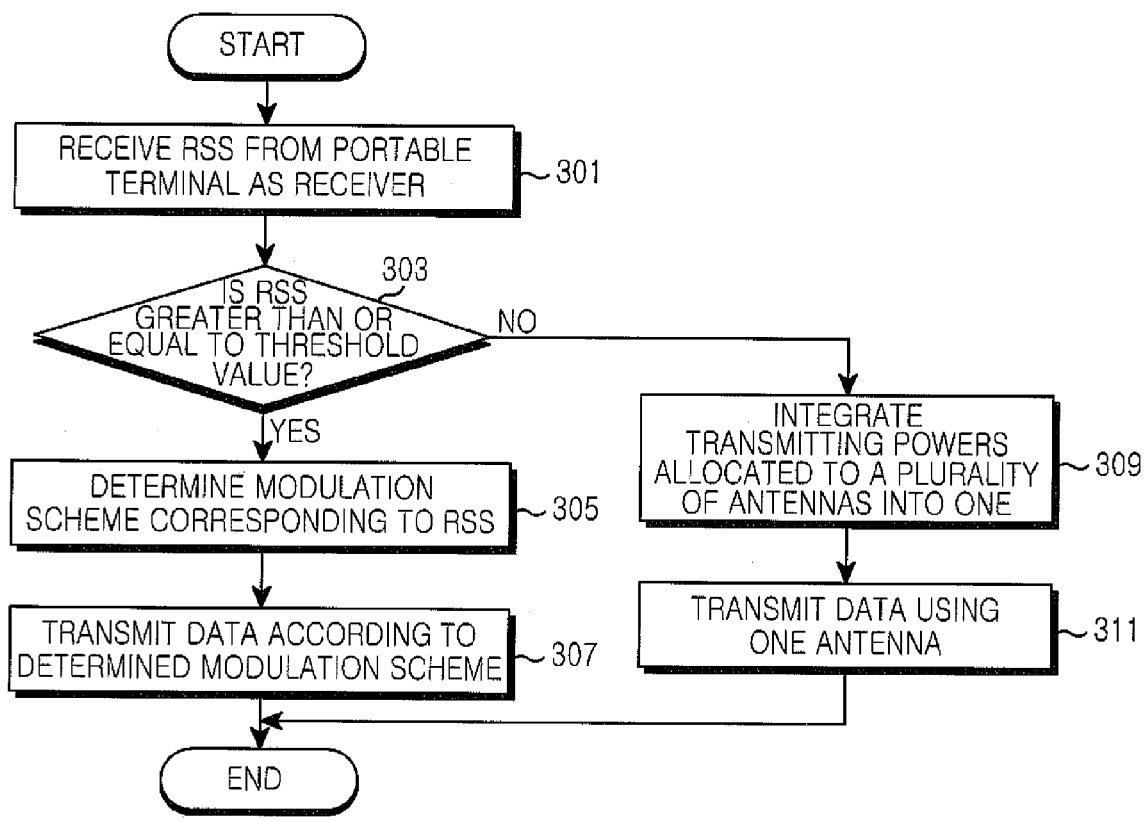
FIG. 3 is a flowchart of a method of increasing a data transfer rate in a transmitter according to the present invention.

FIG. 3 shows a process of increasing a data transfer rate in a transmitter according to the present invention. In FIG. 3, in step 301, the controller 210 of the transmitter 200 receives a RSS from a receiving portable terminal. The receiving portable terminal measures the RSS using a Signal-to-Noise Ratio (SNR) of a downlink and transmits information as to the SNR to the transmitter 200 through an uplink.

The transmitter 200 and the receiving portable terminal may request or transmit the RSS through a feedback path (e.g., a Paging Channel (PCH)), a Random Access Channel (RACH), or the like. In other words, the transmitter 200 may request the RSS of the receiving portable terminal through the PCH, and the receiving portable terminal may transmit the RSS to the transmitter 200 through the RACH.

In step 303, the controller 210 checks whether the RSS is greater than or equal to a threshold value necessary for communications between a transmitter and a receiver. The threshold value refers to a strength of a signal necessary for determining whether communications can be performed between the transmitter and the receiver, i.e., a value smaller than a minimum RSS of BPSK.

If the RSS is not greater than or equal to the threshold value in step 303, the controller 210 goes to step 309 to instruct the power manager 214 to integrate transmitting powers allocated to the plurality of antennas 230 and 240 into one antenna.

For example, if a transmitting power of the first antenna 230 is P1, a transmitting power of the second antenna 240 is P2, and each of the transmitting powers P1 and P2 is smaller than the RSS, the controller 210 instructs the power manager 214 to combine the transmitting powers P1 and P2 and allocate the combined transmitting power to one antenna to transmit data through the antenna.

If transmitting powers allocated to the plurality of antennas 230 and 240 are integrated as described above, the RSS may be increased. Thus, the difficulty of transmitting the data due to a low RSS can be overcome.

In step 311, the controller 210 transmits the data through the antenna using the transmitting power integrated by the power manager 214.

If the RSS is greater than or equal to the threshold value in step 303, the controller 210 proceeds to step 305 to instruct the modulator 212 to determine a modulation scheme corresponding to the RSS.

The modulator 212 may be instructed by the controller 210 to check a modulation and coding scheme, which defines a usable modulation scheme according a RSS pre-stored in the transmitter 200 as shown in Table 1 below, and then select the modulation scheme.

TABLE 1

| Level | Symbol Size | Threshold Value of RSS (dB) |
|---|---|---|
| 1 | 2 | 3.53 |
| 2 | 4 | 10.25 |
| 3 | 8 | 13.93 |
| 4 | 16 | 17.24 |
| 5 | 32 | 20.39 |
| 6 | 64 | 23.47 |

TABLE 1-continued

| Level | Symbol Size | Threshold Value of RSS (dB) |
|---|---|---|
| 7 | 128 | 26.53 |
| 8 | 256 | 29.55 |
| 9 | 512 | 32.57 |

For example, if the RSS received from the receiving portable terminal is 25 decibels (dB), the modulator 212 may select a 64QAM modulation scheme.

In step 307, the controller modulates the data using the modulation scheme determined by the modulator 212 and then transmits the modulated data to the portable terminal. The data can be transmitted through the plurality of antennas 230 and 240 using a Multi Input Multi Output (MIMO) method to increase a data transfer rate.

The controller 210 then ends the process.

Figure 4:
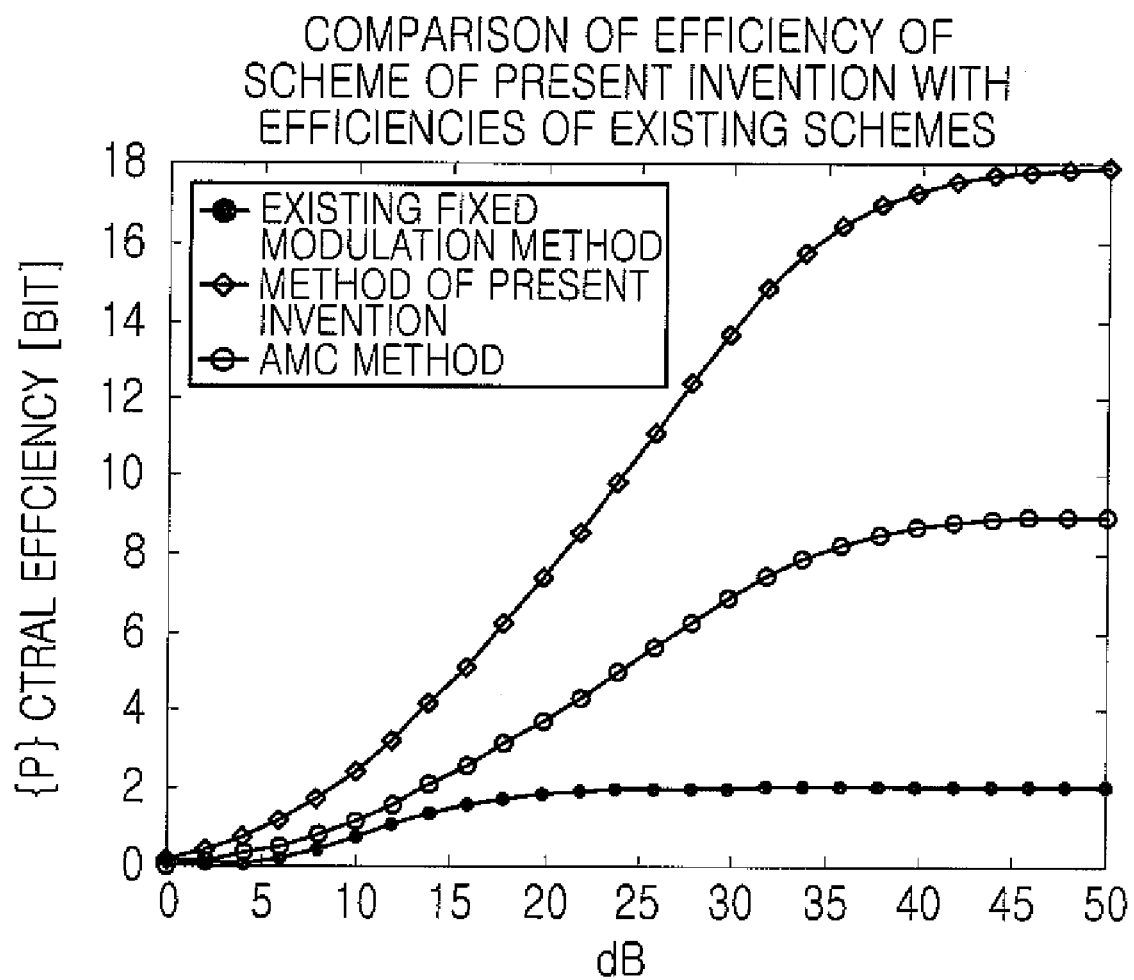
FIG. 4 is a graph comparing a data transfer rate of a transmitter of the present invention with a data transfer rate of a conventional transmitter.

FIG. 4 is a graph comparing a data transfer rate of a transmitter of the present invention with a data transfer rate of a conventional transmitter. In FIG. 4, measured data transfer rates are compared between a data transfer rate measured when a modulation scheme of changing channel environments of a downlink and an AMC scheme of changing a coding rate of a channel coder is used and a data transfer rate measured when a conventional fixed modulation scheme is used.

When an AMC scheme and a method of controlling a transmitting power are adopted in a transmitter desiring to transmit data as described above in the present invention, a data transfer rate can be increased more than when a fixed modulation scheme or an AMC scheme are independently used. For example, when a fixed 4QAM modulation scheme is used, data of 2 bits can be transmitted per one symbol. Also, when a maximum 512QAM modulation scheme is used, data of 9 bits can be transmitted per one symbol.

In other words, when an AMC scheme and a method of controlling a transmitting power are used in a transmitter desiring to transmit data, data of 18 bits can be transmitted per one symbol. Thus, a data transfer rate can be double or more than a conventional transfer rate.

In accordance with the present invention as described above, a method of transmitting data through a plurality of antennas to multi-paths can be used. Also, if the data cannot be transmitted due to a weak RSS of a receiving portable terminal receiving the data, a method of controlling a transmitting power of a transmitter can be used. As a result, a data transfer rate of the transmitter can be improved.

Alternate embodiments of the present invention can also include computer readable codes on a computer readable medium. A computer readable medium includes any data storage device that can store data that can be read by a computer system. Examples of a computer readable medium include magnetic storage media (such as ROM, floppy disks, and hard disks, among others), optical recording media (such as CD-ROMs, DVDs, etc.), and storage mechanisms, such as carrier waves or the like (such as transmission through the Internet). A computer readable medium can also be distributed over network coupled computer systems so the computer readable code is stored and executed in a distributed fashion. Also, functional programs, codes, code segments, etc., for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of transmitting data in a transmitter having a plurality of antennas, the method comprising:
   receiving a Received Signal Strength (RSS) from a receiving portable terminal and determining whether data can be transmitted at the RSS;
   integrating transmitting powers allocated to the plurality of antennas into one antenna to transmit the data when the data cannot be transmitted at the RSS; and
   transmitting the data using an Adaptive Modulation and Coding (AMC) scheme when the data can be transmitted at the RSS.

2. The method of claim 1, wherein the transmission of the data using the AMC scheme comprises:
   determining a modulation scheme corresponding to the RSS received from the receiving portable terminal; and
   modulating the data using the determined modulation scheme.

3. The method of claim 2, wherein the RSS received from the receiving portable terminal is compared with a modulation and coding scheme defining a minimum RSS at which communications can be performed using each modulation scheme, to determine the modulation scheme.

4. The method of claim 1, wherein the transmitter requests the RSS of the receiving portable terminal through a feedback path.

5. The method of claim 4, wherein the receiving portable terminal transmits the RSS to the transmitter through the feedback path.

6. The method of claim 5, wherein the feedback path includes at least one of a Paging Channel (PCH) and a Random Access Channel (RACH).

7. The method of claim 1, wherein the RSS at which the data can be transmitted is greater than or equal to a reference threshold value for determining whether communications can be performed between the transmitter and a receiver.

8. The method of claim 7, wherein the reference threshold value is smaller than a minimum RSS at which communications can be performed using Binary Phase-Shift Keying (BPSK) through which one bit can be transmitted per one symbol.

9. An apparatus for transmitting data using an Adaptive Modulation and Coding (AMC) scheme and a control of a transmitting power, the apparatus comprising:
   a controller for controlling one of a power manager and a modulator according to a Received Signal Strength (RSS) received from a receiving portable terminal;
   the power manager for allocating transmitting powers to a plurality of antennas and integrating transmitting powers allocated to the plurality of antennas into one antenna when the RSS is smaller than a reference threshold value; and
   the modulator for determining a modulation scheme corresponding to the RSS to modulate the data using the determined modulation scheme when the RSS is greater than or equal to the reference threshold value.

10. The apparatus of claim 9, wherein the modulator compares the RSS received from the receiving portable terminal with a modulation and coding scheme defining a minimum RSS at which communications can be performed using each modulation scheme, to determine the modulation scheme.

11. The apparatus of claim 9, wherein the transmitter requests the RSS of the receiving portable terminal through a feedback path.

12. The apparatus of claim 11, wherein the receiving portable terminal transmits the RSS to a transmitter of the apparatus through the feedback path.

13. The apparatus of claim 12, wherein the feedback path comprises at least one of a Paging Channel (PCH) and a Random Access Channel (RACH).

14. The apparatus of claim 9, wherein the reference threshold value is smaller than a minimum RSS at which communications can be performed using Binary Phase-Shift Keying (BPSK) through which one bit can be transmitted per one symbol.

15. A method of transmitting data in a transmitter having a plurality of antennas, the method comprising:
    receiving a Received Signal Strength (RSS) from a receiving portable terminal and determining whether data can be transmitted at the RSS;
    integrating transmitting powers allocated to the plurality of antennas into one antenna to transmit the data when the data cannot be transmitted at the RSS; and
    transmitting the data using an Adaptive Modulation and Coding (AMC) scheme when the data can be transmitted at the RSS.

16. A non-transitory computer-readable recording medium having recorded thereon a program transmitting data in a transmitter having a plurality of antennas, the non-transitory computer readable recording medium comprising:
    a first segment, for receiving a Received Signal Strength (RSS) from a receiving portable terminal and determining whether data can be transmitted at the RSS;
    a second segment, for integrating transmitting powers allocated to the plurality of antennas into one antenna to transmit the data when the data cannot be transmitted at the RSS; and
    a third segment, for transmitting the data using an Adaptive Modulation and Coding (AMC) scheme when the data can be transmitted at the RSS.

* * * * *